United States Patent [19]
Kusumoto et al.

[11] Patent Number: 5,311,207
[45] Date of Patent: May 10, 1994

[54] IMAGE DRAWING APPARATUS FOR DISPLAYING INPUT IMAGE ON DISPLAY MEANS

[75] Inventors: Hiroki Kusumoto; Hiroshi Yasuhara, both of Tokyo, Japan

[73] Assignee: Sony Corporation, Japan

[21] Appl. No.: 13,238

[22] Filed: Feb. 3, 1993

Related U.S. Application Data

[63] Continuation of Ser. No. 683,556, Apr. 10, 1991, abandoned.

[30] Foreign Application Priority Data

Apr. 19, 1990 [JP] Japan ................... 2-103766

[51] Int. Cl.$^5$ ............................................. G09G 1/28
[52] U.S. Cl. ................................... 345/150; 345/173; 345/186
[58] Field of Search .................. 358/22, 183, 104; 178/18; 352/52; 395/153, 154; 340/706, 708, 711, 712, 703, 724, 725, 792; 345/123, 125, 150, 153, 186

[56] References Cited

U.S. PATENT DOCUMENTS

| | | | |
|---|---|---|---|
| 4,162,493 | 7/1979 | Ross et al. | 340/755 |
| 4,484,187 | 11/1984 | Brown et al. | 340/724 |
| 4,524,421 | 6/1985 | Searby et al. | 340/703 |
| 4,689,616 | 8/1987 | Goude et al. | 340/724 |
| 4,709,230 | 11/1987 | Popouski et al. | 340/701 |
| 4,752,836 | 6/1988 | Blanton et al. | 358/104 |
| 4,782,335 | 11/1988 | Gussin | 340/703 |
| 4,827,253 | 5/1989 | Maltz | 358/183 |
| 4,908,700 | 3/1990 | Ishii et al. | 358/183 |
| 4,933,514 | 6/1990 | Bowers | 340/712 |
| 4,949,180 | 8/1990 | Miles | 340/723 |
| 4,952,051 | 8/1990 | Lovell et al. | 352/52 |
| 4,999,709 | 3/1991 | Yamazaki et al. | 358/183 |
| 5,126,834 | 6/1992 | Enomoto et al. | 358/28 |
| 5,212,544 | 5/1993 | Kellar et al. | 358/22 |

FOREIGN PATENT DOCUMENTS

| | | |
|---|---|---|
| 0414565 | 2/1991 | European Pat. Off. . |
| 0414566 | 2/1991 | European Pat. Off. . |

*Primary Examiner*—Alvin E. Oberley
*Assistant Examiner*—Steven J. Saras
*Attorney, Agent, or Firm*—Ronald P. Kananen

[57] ABSTRACT

The present invention is directed to an image drawing apparatus suitable for use in, for example, a video titler for superimposing desired characters, figures or the like on an image reproduced from a video signal. This image drawing apparatus is comprised of a memory for storing a plurality of predetermined color data, processor for outputting colors corresponding to the color data at display positions on a display screen, coordinate data input device for inputting coordinates on the display screen, and a control circuit for sequentially moving an array of the plurality of color data, wherein colors corresponding to the plurality of color data are respectively superimposed on a shape designated by coordinates inputted by the coordinate data input device, thereby making it possible to draw moving characters, figures or the like producing high visual effects in a simple structure without making complicated designation.

11 Claims, 14 Drawing Sheets

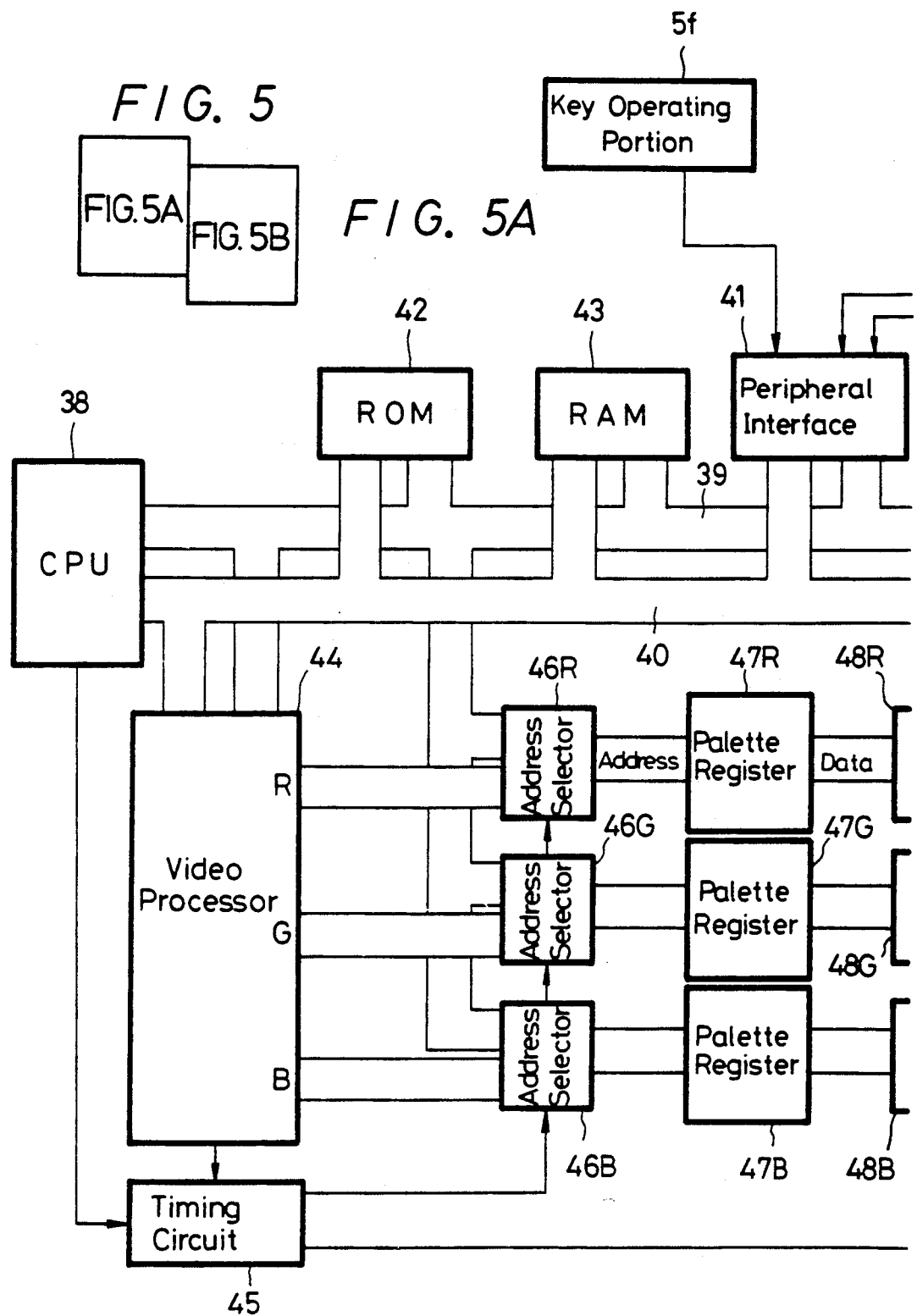

FIG. 9A  74  First Color Table

| Color Number | R | G | B |
|---|---|---|---|
| 1 | | | |
| 2 | | | |
| 3 | | | |
| MAX | | | |

FIG. 9B  75  Second Color Table

| Color Number | R | G | B |
|---|---|---|---|
| 1 | | | |
| 2 | | | |
| 3 | | | |
| MAX | | | |

FIG. 13
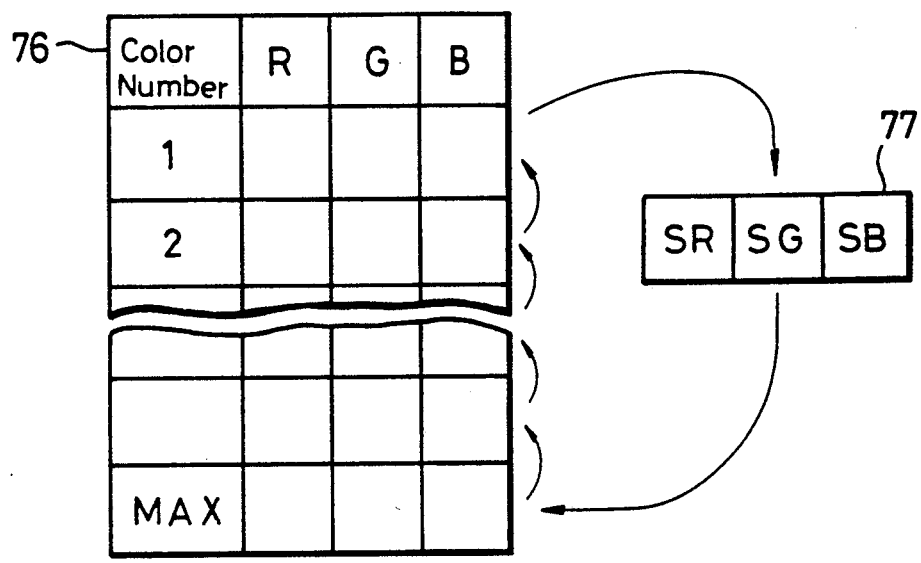
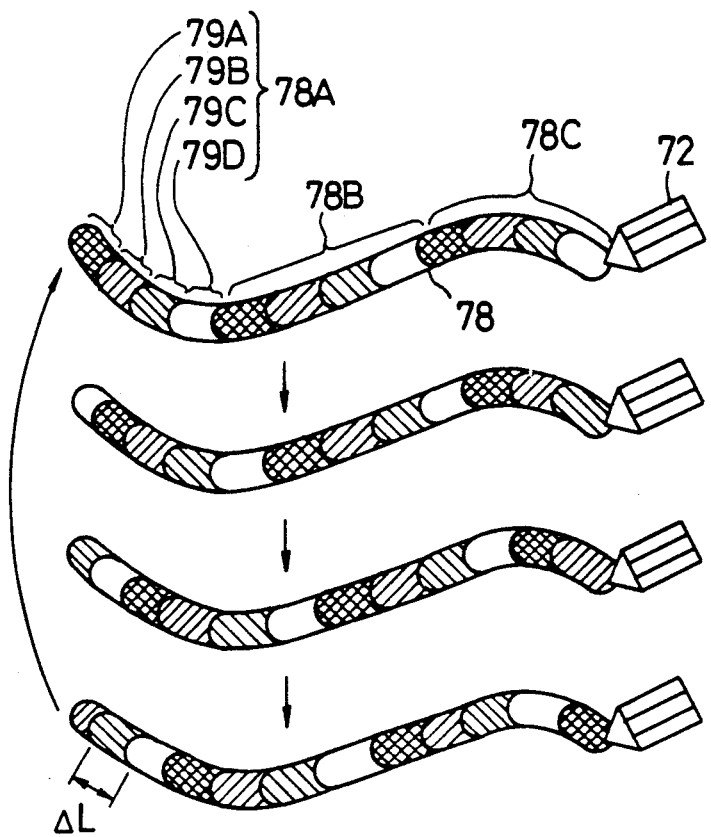
FIG. 14A
FIG. 14B
FIG. 14C
FIG. 14D

IMAGE DRAWING APPARATUS FOR DISPLAYING INPUT IMAGE ON DISPLAY MEANS

This application is a continuation of application Ser. No. 07/683,556 filed Apr. 10, 1991 now abandoned.

BACKGROUND OF THE INVENTION

1. Field of the Invention

The present invention generally relates to image drawing apparatus and, more particularly, is directed to an image drawing apparatus suitable for use in a so-called video titler for superimposing desired characters, figures and the like, for example, on an image generated by a video 2. Description of the Prior Art There is known a so-called video titler for superimposing desired characters, figures or the like on an image reproduced from a video signal or the like outputted from a VTR (video tape recorder). Such a video titler allows an effective video edit by, for example, inserting characters of "Entrance Ceremony" on a scene of an entrance ceremony, displaying a balloon in the vicinity of a person and writing desired words in the balloon, and so on.

A conventional video titler is provided with a tracking ball having two rotating freedoms and capable of designating a series of two-dimensional coordinates and a keyboard. By the use of the tracking ball and keyboard, the shape and position of a figure to be superimposed on an image reproduced from a video signal are selected. In this event, the figure can be painted in a desired color selected by the operator from a plurality of predetermined colors.

However, even though the operator can select a color for painting a figure when drawing the figure by means of a conventional video titler, the painted condition is fixed, and therefore the color of the figure cannot be automatically changed after drawing the figure. Further, although a colorful figure can be drawn by combining a variety of colors during drawing, the drawn figure is a still image while an image reproduced from a video signal is a moving image, which causes an inconvenience that a moving figure cannot be drawn.

In this respect, it is possible to draw a moving figure by using an apparatus which is capable of drawing and storing color moving images. However, such an apparatus is large in size and expensive. Further, the operator must designate complicated parameters, which presents an inconvenience that the user cannot use the above apparatus readily as a video titler.

OBJECTS AND SUMMARY OF THE INVENTION

Accordingly, it is an object of the present invention to provide an improved image drawing apparatus in which the aforenoted shortcomings and disadvantages encountered with the prior art can be substantially eliminated.

More specifically, it is an object of the present invention to provide an image drawing apparatus which is simple in structure and capable of drawing moving characters, figures and so on exhibiting high visual effects without making complicated designations.

As an aspect of the present invention, an image drawing apparatus is comprised of a memory for storing a plurality of predetermined color data, a processor for outputting colors corresponding to the color data on display positions on a display screen, a coordinate data input device for inputting a coordinate on the display screen, and a control circuit for sequentially moving an array of the plurality of color data, wherein colors corresponding to the plurality of color data are moved and superimposed upon a shape designated by coordinates inputted by said coordinate data input means.

According to the above-mentioned present invention, a figure designated by coordinates inputted by the coordinate data input device is divided into a plurality of parts in a single color or different colors. Then, by sequentially, for example, recursively moving an array of the plurality of color data in the memory, colors of the plurality of divided parts of the figure are recursively changed. It is therefore possible to draw a moving figure exhibiting significant visual effects without making a complicated designation in a simple structure.

The above, and other objects, features and advantages of the present invention will become apparent in the following detailed description of an illustrative embodiment thereof to be taken in conjunction with the accompanying drawings, in which like reference numerals are used to identify the same or similar parts in the several views.

BRIEF DESCRIPTION OF THE DRAWINGS

FIG. 9, comprising FIGS. 9A and 9B, is a schematic diagram showing contents of a color table;

FIG. 13 is a schematic diagram used to explain a procedure of modifying contents of the color table;

FIG. 14, comprising FIGS. 14A, 14B, 14C and 14D, is a schematic diagram showing the way of how colors in a vortex line of the embodiment are changed;

DETAILED DESCRIPTION OF THE PREFERRED EMBODIMENT

An embodiment of the present invention will hereinbelow be explained with reference to the drawings. In this embodiment, the present invention is applied to a video titler for superimposing characters, figures or the like on an image reproduced from a video signal or the like.

Figure 1:
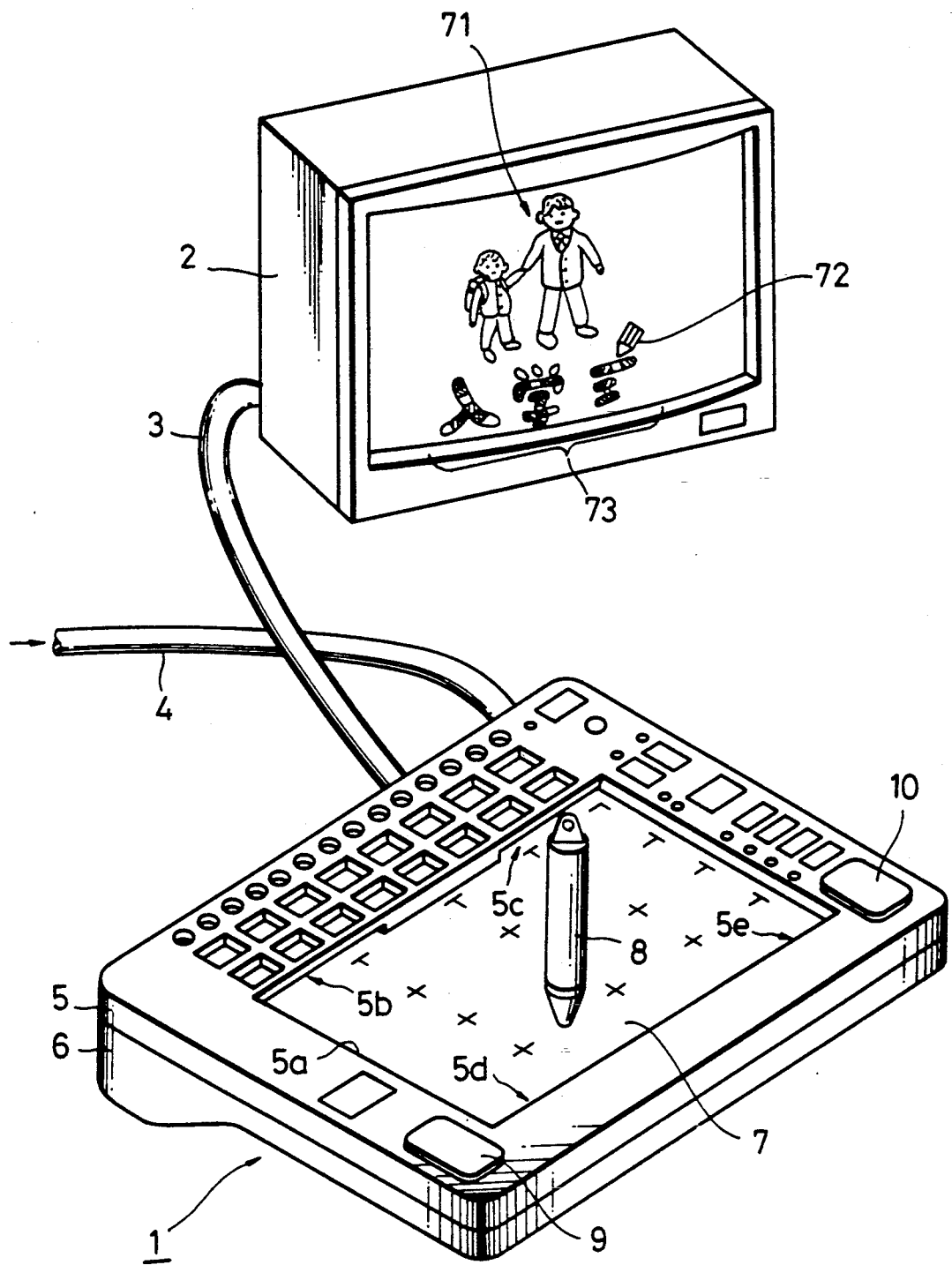
FIG. 1 is a perspective view illustrating a system arrangement of an embodiment of a video titler according to the present invention.

FIG. 1 shows an example of the structure of a system according to the present embodiment. In FIG. 1, reference numeral 1 generally designates a video titler, and 2 a monitor equipped with a video signal input terminal. A video output terminal of the video titler 1 is connected to the video input terminal of the monitor 2 with a video cable 3. Also, a video input terminal of the videl titler 1 is supplied with a video signal from a VTR, a video camera or the like, not shown, through a video cable 4. A cabinet of the video titler 1 is composed of an upper case 5 and a lower case 6. Through the upper case 5 there is formed a cut-away portion 5a of rectangular configuration, and a pressure-sensitive tablet 7 is disposed beneath the cut-away portion 5a as a coordinate input surface of pressure-sensitive type position detecting apparatus. At contact portions of the cut-away portion 5a with the tablet 7, there are formed grooves 5b, 5c, 5d and 5e. The grooves 5d, 5e are respectively symmetric with the grooves 5b, 5c. These grooves 5b–5e are used to fix a sheet used for tracing no the tablet 7 so as to remove its movement.

Reference numeral 8 designates an attached pen made of plastics, and numerals 9 and 10 respectively denote executing buttons. As a basic operation, by drawing lines forming desired characters or the like (in the present embodiment, Japanese characters 入学 representing "Entrance Company") on the tablet 7 by using the attached pen 8 or the fingertip or the like slightly pressed thereagainst, with the executing buttons, 9 or 10 being held pressed, a cursor 72 in the form of a pen is displayed on the screen of the monitor 2 and moves in association with the trajectory of the finger or the like, whereby the trajectory is displayed on the screen as title characters 73. Then, these title characters 73 are wiped in an image 71 reproduced from a video signal and inputted from the outside to thereby superimpose the title characters 73 on the image 71. Further, in the present embodiment, Japanese characters 入学式 (Entrance Ceremony) are painted in a stripe fashion, and the colors thereof are changed to appear as if they are streaming, by the instruction of the operator. Such mechanism will be later referred to.

Figure 2:
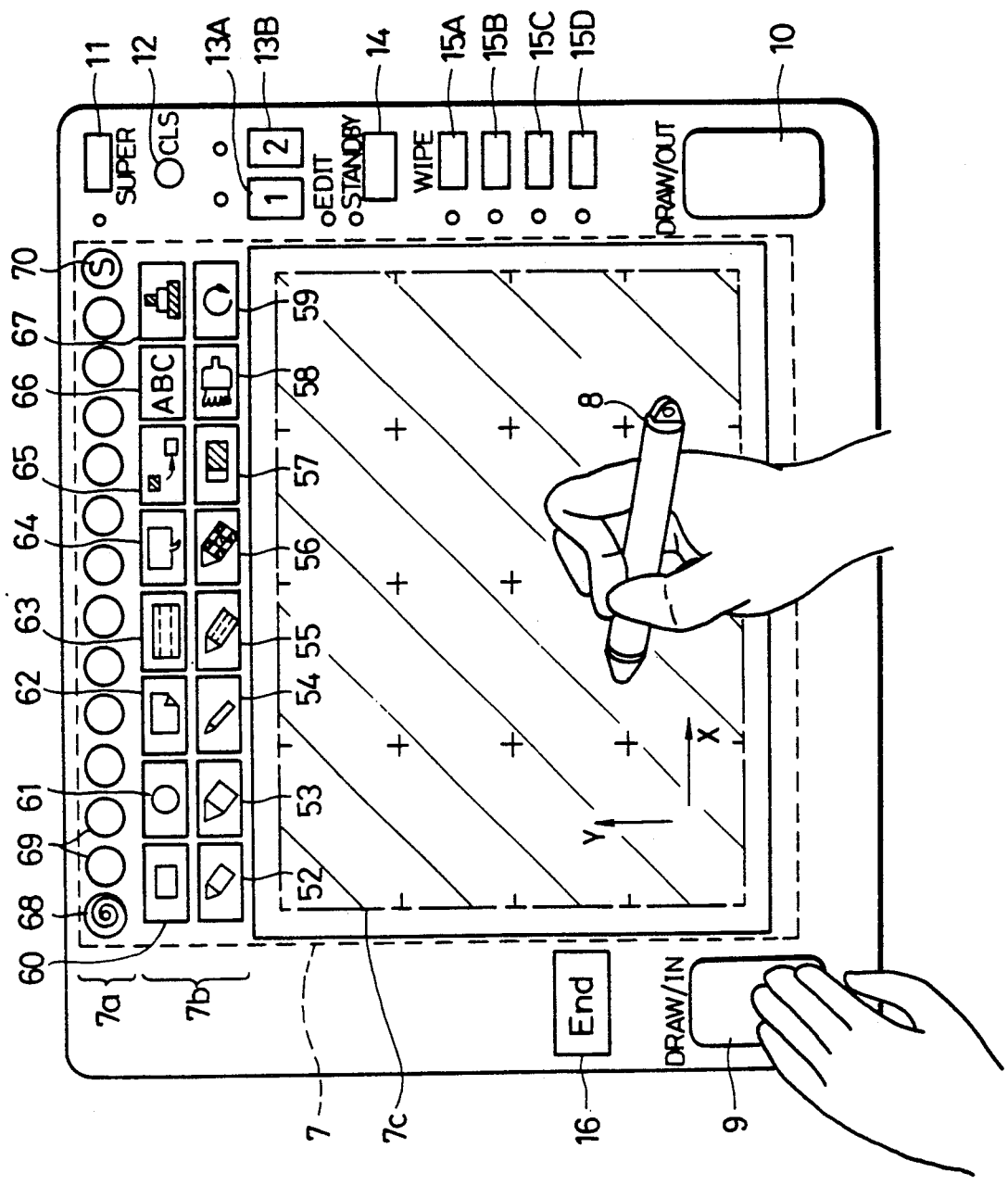
FIGS. 2 and 3 are a plan view and a rear view of the video titler of the embodiment of the present invention, respectively.

Through the upper portion of the cut-away portion 5a of the upper case 5 of the video titler 1, there are bored fourteen (14) circular small holes and eight pairs of rectangular small holes through which a variety of commands are selected by pushing the tablet 7 with the attached pen 8 or the like. As shown in FIG. 2, the coordinate input surface of the tablet 7 is divided into a color selecting area 7a corresponding to the fourteen circular holes, a command selecting area 7b corresponding to the eight pairs of rectangular holes and a drawing area 7c (a hatched portion) surrounded by cross signs. The aspect ratio of the drawing area 7c conforms to that (3:4) of the screen of an ordinary monitor. The pixel ratio, which indicates the ratio of the resolution in the vertical direction (Y-direction) to the resolution of the horizontal direction (X-direction) of the input coordinates of the tablet 7 also conforms to the pixel ratio of an ordinary monitor. Therefore, the present embodiment provides an advantage that a precise circle drawn on the drawing area 7c is displayed on the screen of the monitor 2 likewise as a precise circle image.

Explaining the operation of the video titler 1 when the tablet 7 is pushed through eight pair of, that is, 16 rectangular holes 52 to 67 in the command selecting area 7b and when the tablet 7 is pushed through circular holes 68, 70 at both of left and right ends and 12 holes 69 on an intermediate portion in the color selecting area 7a, it is assumed that these holes 52, 68 and so on are respectively referred to as "buttons" and pushing the tablet 7 through these holes 52, 68 and so on is referred to as "pushing a button".

First, the buttons 52 to 67 in the command selecting area 7b are respectively named as follows and functions corresponding thereto are defined as follows:

Fine Line Button 52 ... draws a free curve in a width of two dots;

Bold Line Button 53 ... draws a free curve in a width of four dots;

Pipe Button 54 ... draws a pipe-like free curve in a width of six dots by gradually changing colors in three stages in the width direction. There is also provided a method of drawing a free curve in a width of 6 dots with a black edge of a 2-dot width for which an edge button is provided;

Plate Line Button 55 ... draws a straight line of a 12-dot width in a grain pattern. More specifically, a grain pattern in two colors resembling a grain having a 2-dot black edge, and a shadow is drawn in a width of 12 dots. A nail pattern is also drawn at each of the four corners thereof so as to appear that the plate is fixed by the nails.

Checker Button 56 ... draws a free line in a checker pattern (lattice pattern). Thus, the background image is visible therethrough;

Eraser Button 57 ... erases previously drawn figures with a rectangular pattern in 6×6 dots in the same color as the background;

Brush Pattern 58 ... The cursor 72 displayed on the screen of the monitor 2 is transformed to be a brush shape, with which a closed region is filled with a designated color.

Cancel Button 59 ... recovers a screen one procedure before. The one procedure principally refers to an operation executed during the executing button 9 or 10 is being pressed.

Rectangle Button 60 ... draws a rectangle, the diagonal line of which is a line defined by designating coordinates of two points;

Circle Button 61 ... draws the circumference of a circle inscribed in a rectangle pattern;

Paper Button 62 ... draws a rectangular paper pattern, the diagonal line of which is a line defined by designating coordinates of two points. The lower right corner of the paper pattern is turned up, and further a pin pattern is drawn at two upward locations thereof.

Wooden Plate Button 63 ... draws a rectangular plate-like pattern having a grain by the same manipulation as the rectangle button 60. A nail bore is drawn at each of four corners of the pattern;

Balloon Button 64 ... used to draw a so-called balloon for surrounding words spoken by a person;

Copy Button 65 ... copies an area designated by the same manipulation as the rectangle button 60 on another region of the screen;

Character Button 66 ... When this character button 66 is selected, a large number of patterns of characters and symbols in 16×16 dots are displayed. By selecting a desired pattern from these patterns, a pattern previously stored in the video titler 1 is drawn; and Stamp Button 67 ... selects a stamp pattern in 256×212 dots at maximum by a manipulation similar to the character button 66.

Next, the colors of characters, figures and so on presently being drawn on the monitor 2 can be respectively set to either of 12 kinds of colors (white, yellow, orange, red, purple, dark blue, blue, sky blue, black, and so on) by pressing either of the 12 buttons 69 in the color selecting area 7a. For this reason, these 12 buttons 69 are respectively called a color selecting button. A button 70 is a super color button for designating a so-called super color. Pressing the super color button 70 with a superimposing button 11, later described, being off, causes a presently selected color to shine for approximately one second and then the color of a figure or the like to be drawn to become identical to the background color (transparent). Then, turning on the superimposing button 11 permits painting the so far transparent figure or the like in a color selected at the time of selecting the super color button 70. Incidentally, if the super color button 70 is pressed before the color selecting button 69 is pressed, black is automatically designated as a superimposed color.

Also, a depression of the vortex button 68 causes the colors of the title characters 73 superimposed on the background image 71 on the monitor 2 shown in FIG. 1 to change in a stripe fashion as well as the colors forming the stripe to stream in accordance with a predetermined rule to change as if they rotated or flowed out. Such a color stripe changing like a stream (there may be a case where the colors may be changed at every character) will be hereinbelow called "the vortex color", a mode in which this color stripe is selected "the vortex mode", and the button 68 for designating this mode "the vortex button", respectively. In the present embodiment there are provided for the vortex mode 10 kinds of types (red group/blue group/yellow group/green group/brown group/purple group/gray group/shooting star group/gold group/silver group). These 10 kinds of types are recursively changed by further keeping pressing the vortex button 68. The vortex color is realized by a palette switching of a plurality of colors, later described. More specifically, for realizing a vortex color in the red group for a curve by means of a palette switching of three colors, by way of example, the curve is divided into a series of multiple sections, and the series of these sections are recursively painted sequentially in light red→red→deep red→... at intervals of 3 sections at a certain time. In addition, the three kinds of colors are orderly changed in each of the three sections according to a predetermined rule for every predetermined time (for example, for every 0.3 second) after drawing or in course of drawing. Alternatively, a shooting star pattern is generated by replacing only one of the plurality of colors with white and the other colors with black. Further, a pattern like a streaming gold or silver is generated by replacing all of the plurality of colors with a single color and sometimes changing the lightness of a part of them.

Figure 3:
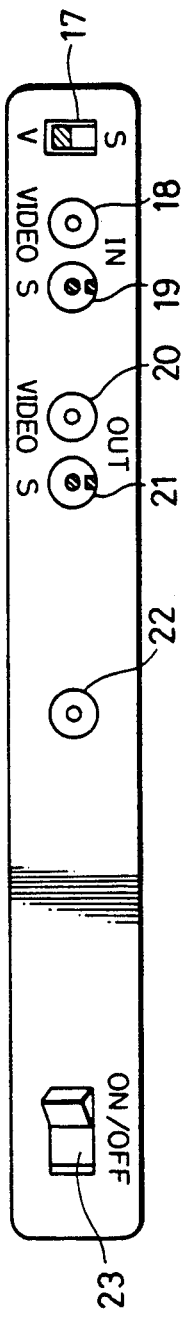

Explaining operating buttons other than those for pushing the pressure sensitive tablet 7 of the video titler 1 with reference to FIGS. 2 and 3, first, the executing button 9 is so used that when a title including characters, figures or the like is being drawn (in an edit mode), a trajectory drawn by the attached pen 8 and so on during the executing button 9 being pressed is principally effective and displayed on the monitor 2. On the other hand, during a waiting state in order to superimpose a previously coupled title (a wipe pattern) on an image reproduced from a video signal, the executing button 9 serves as a starting button for a wipe-in operation. The executing button 10 in turn serves as a starting button for a wipe-out. In this event, if the executing button 9 is again pressed for a wipe-in operation without wiping out after the executing button 9 has been pressed, a wipe-in operation is executed to further superimpose on the current image or simultaneously with a wipe-out operation.

The superimposing button 11 for superimpose, every time it is pressed, repeats on and off in association with a light emitting element. In an on condition of the superimposing button 11, a portion designated as a super color is superimposed on the background image reproduced from a video signal or the like, as mentioned above. In an off condition of the superimposing button 11, a portion designated as a super color disappears, whereby the background image is visible.

Reference numeral 12 designates a drawn image erasing button, and 13A and 13B respectively drawn image (wipe-in image) selecting buttons. The erasing button 12 is used for clearing data of image in course of drawing. In the present embodiment, it is possible to draw titles for two screens and select which of the screens is to be drawn by designating one of the selecting buttons 13A and 13B. Further, in a stand-by mode, it is possible to select which of the screens is set in a stand-by state by means of the selecting button 13A or 13B. The changeover between the stand-by mode and the edit mode can be carried out by a manipulation of a mode change-over button 14, and a current mode can be identified by a lighting condition of a light emitting element.

Reference numerals 15A-15D designate mode selecting buttons which are effective only in the stand-by mode. The selecting button 15A corresponds to a mode in which the entire image appears or disappears simultaneously with a manipulation of the executing button 9 or 10, the selecting button 15B to a mode for scrolling the screen from the lower part to the upper part, the selecting button 15C to a mode for scrolling the screen from the upper part to the lower part, and the selecting button 15D to a mode in which an image appears or disappears outwardly from the center. Reference numeral 16 designates an end determining button. A manipulation of the end determining button 16 causes a drawn title image to be stored in an internal RAM backed-up by a battery.

FIG. 3 shows the rear panel of the video titler 1 of the present embodiment. In FIG. 3, reference numeral 17 designates a change-over switch, 18 an input terminal (a V terminal) for ordinary video signals, 19 an input terminal (an S terminal) for Y/C separated video signals, 20 an output terminal (V terminal) for the ordinary video signal and 21 an output terminal (S terminal) for the Y/C separated video signal. It is possible to select which of the V terminal and the S terminal is made effective by means of the change-over switch 17. Reference numeral 22 designates a control terminal. By this control terminal 22 the operation of the video titler 1 can be controlled from the outside. Further, reference numeral 23 designates a power source switch. The supply of electric power to internal parts except for the battery backed-up RAM is interrupted by turning off the power source switch 23.

Figure 4:
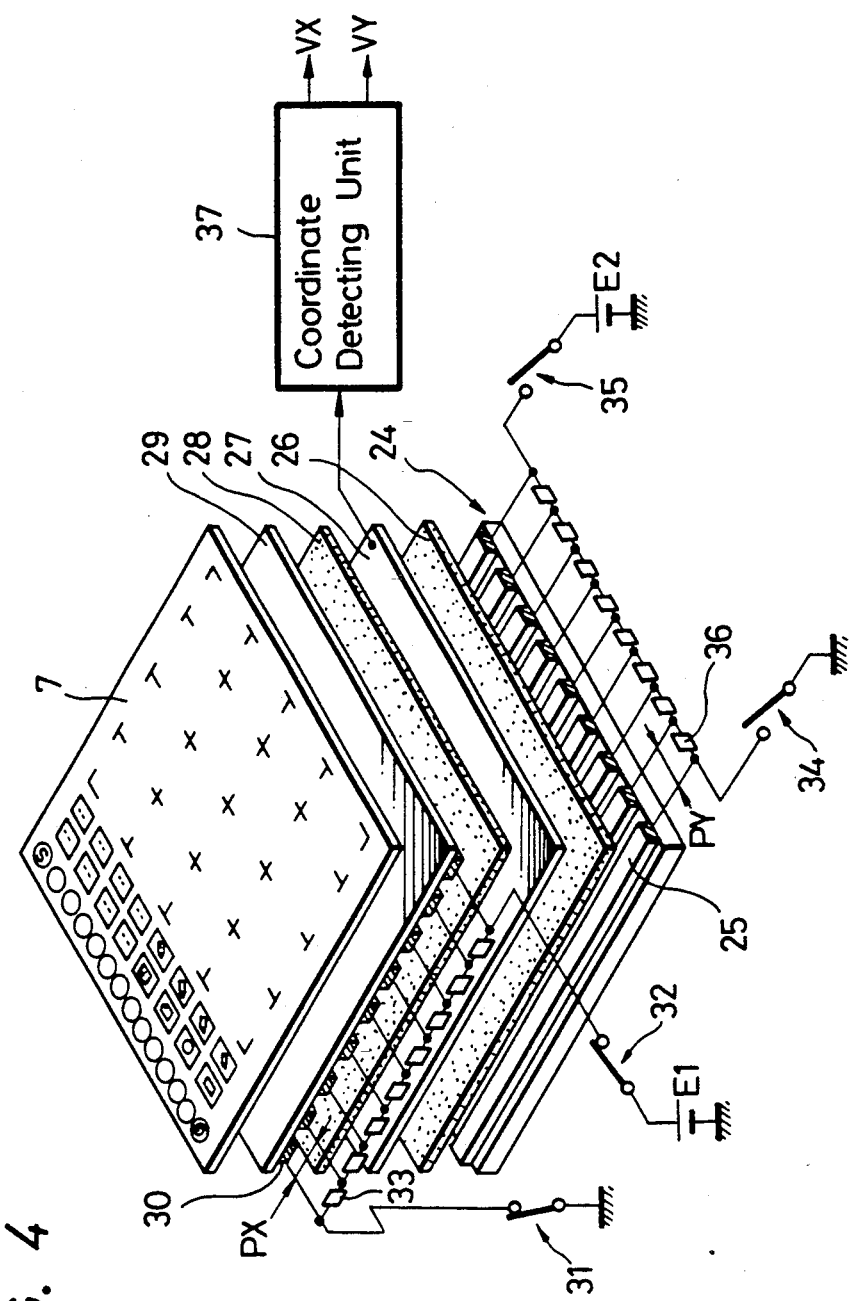
FIG. 4 is a perspective view illustrating a pressure-sensitive type position detecting apparatus housed in the video titler.

The structure of the pressure-sensitive type position detecting apparatus including the pressure-sensitive tablet 7 of the present embodiment will be explained with reference to FIG. 4. In FIG. 4, strip-shaped electrodes 25 are formed with a pitch PX on a first insulating substrate 24. On this first insulating substrate 24, there are sequentially piled a first pressure-sensitive electrically conductive sheet 26 made of electrically conductive rubber, an electrically conductive plate 27, a second pressure-sensitive electrically conductive sheet 28 made of pressure-sensitive electrically conductive rubber and a second insulating substrate 29 which has strip-shaped electrodes 30 formed on the bottom surface thereof with a pitch PY. The tablet 7 is placed on this insulating substrate 29. The electrically conductive plate 27, the second insulating substrate 29 and the tablet 7 are provided with flexibility. The resolution in the X-direction of the input coordinates of the present embodiment is PX while the resolution in the Y-direction PY, wherein the ratio PX:PY is set to be identical to the pixel ratio of minimum pixels of the screen of an ordinary monitor. The values of the resolution PX, PY are both, for example, approximately 0.3 mm.

One strip-like electrode 30 positioned at one vertical end side of the second insulating substrate 29 is grounded through a switch circuit 31, while the strip-like electrode 30 at the other end side is connected through a switch circuit 32 to a direct current voltage source for supplying a voltage El. The respective strip-like electrodes 30 are sequentially connected to each other through resistors 33 having an identical resistance value. Similarly, one strip-like electrode 25 positioned at one horizontal end side of the first insulating substrate 24 is grounded through a switch circuit 34, while one strip-like electrode 25 at the other end side is connected through a switch circuit 35 to a direct current voltage source for supplying a voltage E2. The respective strip-like electrodes 25 are sequentially connected to each other through resistors 36 having an identical resistance value. A depression on a certain position on the tablet 7 causes the pressure-sensitive electrically conductive sheets 26 and 28 to be conductive at the pressed position, whereby the electrically conductive plate 27 is supplied with a voltage corresponding to the coordinate in the Y-direction by closing a pair of the switch circuits 31, 32, while the electrically conductive plate 27 is supplied with a voltage corresponding to the coordinate in the X-direction by closing a pair of the switch circuits 34, 35. Reference numeral 37 designates a coordinate detector unit. The coordinate detector 37 is adapted to generate voltages VX, VY corresponding to input coordinates X, Y on the tablet 7 by alternately closing the pair of the switch circuits 31, 32 or 34, 35 and holding voltages generated on the electrically conductive plate 27. In that case, when input coordinates indicate a position in the color selecting area 7a, an identification is made to which of the color selecting buttons 68-70 is selected by the coordinates. When the input coordinates indicates a position on the command selecting area 7b, it is identified which of the command buttons 52-67 is selected by the coordinates. This pressure-sensitive type position detecting apparatus is disposed between the upper case 5 and the lower case 6 of the video titler 1.

Incidentally, a further detailed structure of the pressure-sensitive type position detecting apparatus shown in FIG. 4 and modified examples thereof are disclosed in Japanese Patent Laid-open Gazette No. 58-90235. However, the coordinate data input means of the present invention is not limited to the pressure-sensitive type, and input coordinates X, Y may be designated by using, for example, a tracking ball, a so-called mouse, or the like.

Figure 5B:
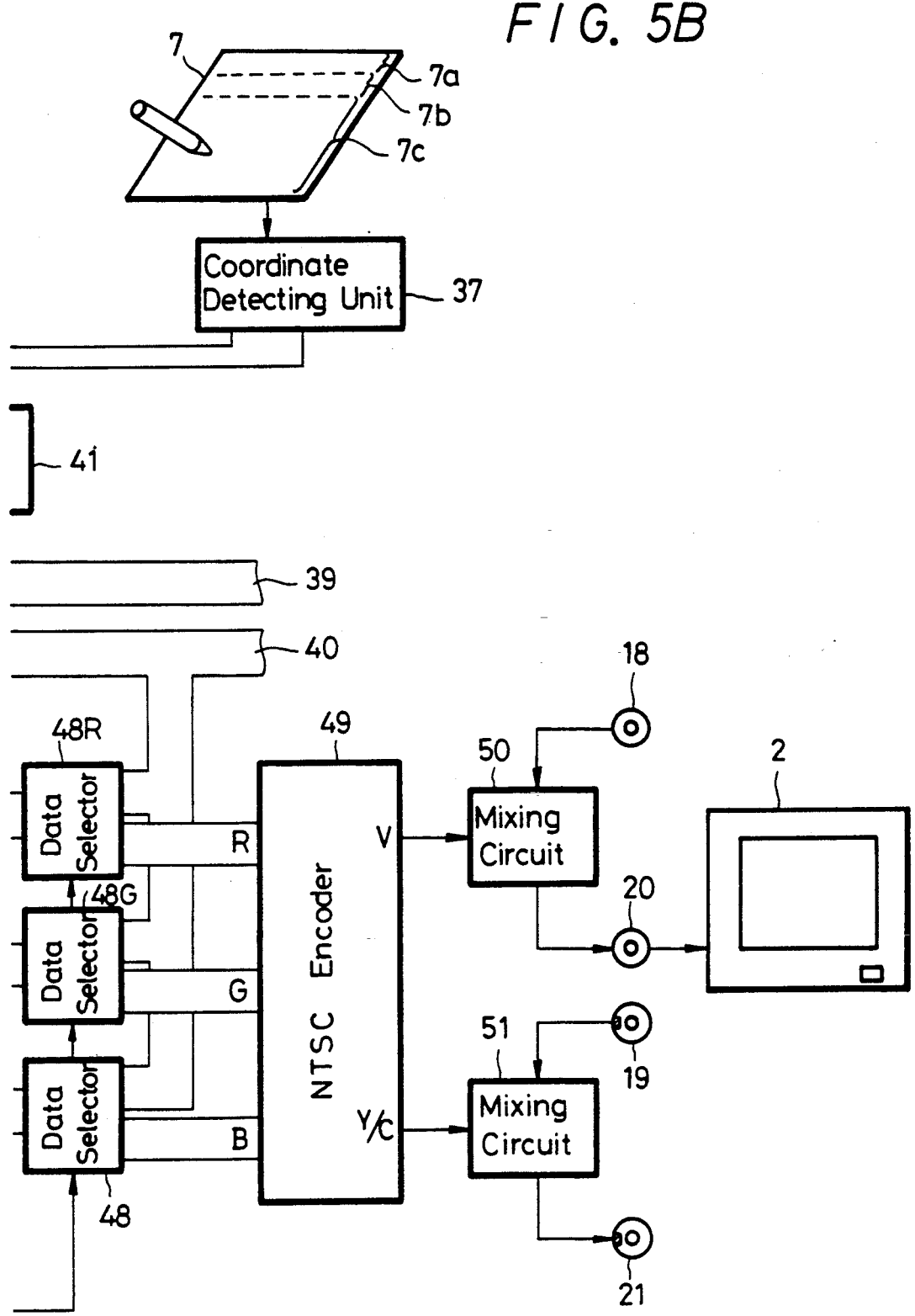
FIG. 5 (formed of FIGS. 5A and 5B drawn on two sheets of drawings so as to permit the use of a suitably large scale) is a circuit block diagram of the video titler of the present invention.

FIG. 5 shows a circuit arrangement of the video titler 1 of the present embodiment. In FIG. 5, reference numeral 38 designates a central processing unit (hereinbelow called "CPU"), 39 an address bus, 40 a data bus, 41 a peripheral interface, 42 a ROM for storing programs, a variety of color data and so on, and 43 a RAM backed-up by a battery. The CPU 38 takes in through the peripheral interface 41 and the buses 39, 40 voltages corresponding to input coordinates X, Y in the coordinate detector 37 as well as detects conditions of the key manipulating section 5f which includes a set of various manipulating keys except for the tablet 7.

Reference numeral 44 designates a video processor (hereinbelow called "VDP") having a built-in video RAM with a capacity of a three-frame portion (a three-screen portion) connected to the buses 39, 40, and 45 a timing circuit. The VDP 44 reads input coordinate data, color data and so on from the RAM 43 and so on based on a command issued by the CPU 38 and writes color image data into corresponding addresses of the built-in VRAM as well as periodically reads out red components R, green components G and blue components B of one frame portion of image data from the VRAM and supplies the same to one input sections of respective address selectors 46R-46B. The other input sections of the address selectors 46R-46B are connected to the address bus 39. Since the VDP 44 of the present embodiment has a three-frame portion of VRAM, it is possible to draw titles for two screens as well as improve the title editing efficiency by maintaining an image one procedure before in the remaining one-screen portion. More specifically, a depression of the cancel button 59 causes an image one procedure before to be displayed.

Reference numerals 47R-47B respectively designate palette registers for holding a plurality of kinds of data on video signal components R, G, B, 48R-48B respectively bidirectional data selectors, and 49 an NTSC encoder. The palette registers 47R-47B are supplied at respective address input sections thereof with output data from the address selectors 46R-46B, respectively. Data input/output sections of the palette registers 47R-47B are connected to the data bus 40 and input sections for components R, G, B of the NTSC encoder 49 through the data selectors 48R-48B. Thus, it is possible to write color image data stored in the ROM 42 or the RAM 43 into predetermined addresses in the respective palette registers 47R-47B through the data selectors 48R-48B, as well as supply the NTSC encoder 49 with color image data at addresses designated by the VDP 44 in the respective palette registers 47R-47B through the data selectors 48R-48B.

In this embodiment, the palette register 47R for red group, for example, is divided into four addresses for storing data representing light red, red, deep red and black, respectively. Similarly, the palette registers 47G, 47B for green and blue groups are respectively divided into four registers. The CPU 38 is capable of writing desired data read out of the ROM 42 or the RAM 43 into a total of 12 addresses, by way of example. Then, a variety of color image data designated by the color selecting button 69 or the like can be supplied to the NTSC encoder 49 by the VDP 44 which combines address data supplied to the palette registers 47R–47B.

The NTSC encoder 49 sequentially converts the supplied image data to a video signal composed of an ordinary composite video signal or Y/C separated video signal and supplies the same to a video signal mixing circuit 50 or 51. The mixing circuits 50 and 51 superimpose a video signal outputted from the NTSC encoder 49 on video signals respectively inputted thereto from the input terminals 18 and 19 and output thus mixed signals to output terminals 20 and 21. In the present embodiment, the output terminal 20 is connected to the monitor 2.

Figure 6:
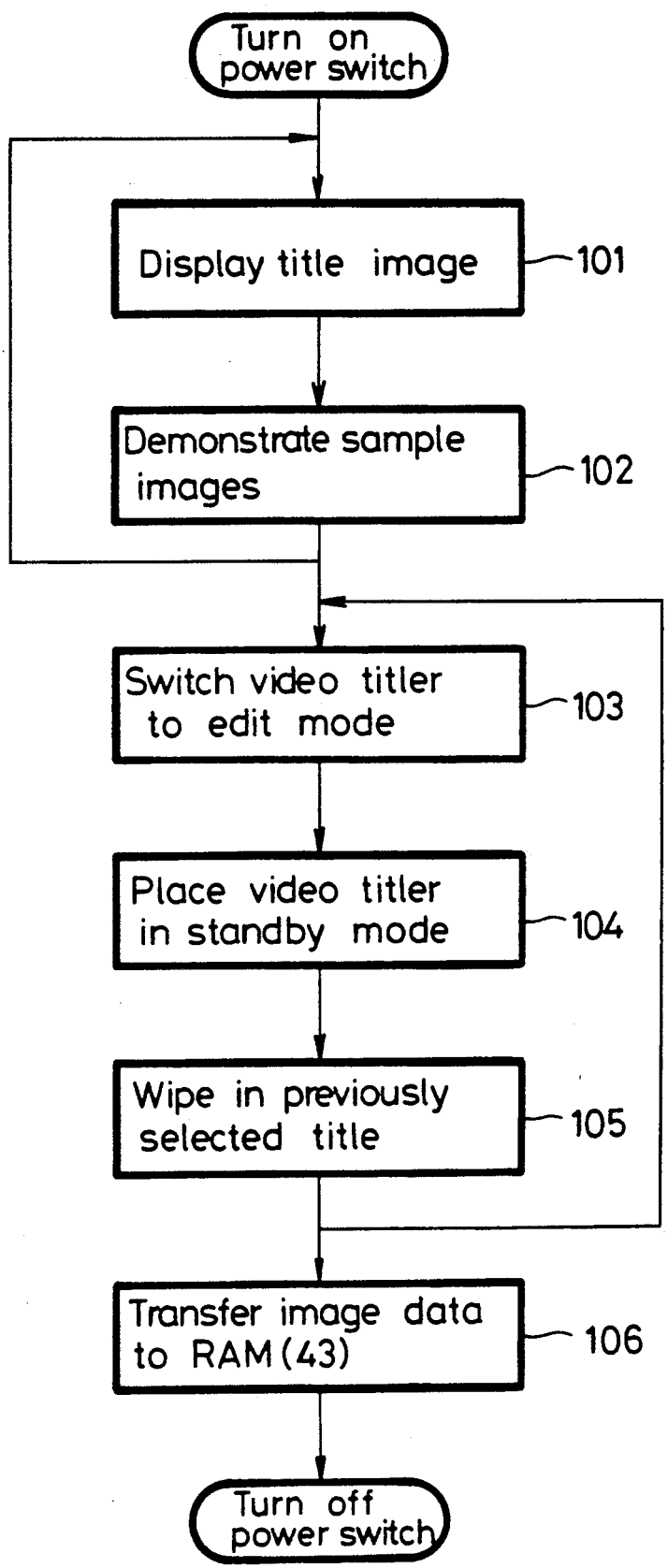
FIG. 6 is a flowchart to which references will be made in explaining fundamental and whole operation of the video titler.

The operation of the video titler 1 shown in the example of FIG. 1 will be generally explained with reference to steps 101 to 106 shown in FIG. 6. When the power supply of the video titler 1 is turned on, a title indicating a demonstration display is displayed on the screen of the monitor 2 for a while, and thereafter a variety of sample images are demonstratively displayed for showing all functions of the video titler 1 (steps 101, 102). If a condition changes in the coordinate input of the tablet 7 or key manipulating section 5f in course of the demonstration display, the mode of the video titler 1 is automatically changed over to the edit mode (step 103), wherein the operator can draw desired titles for up to two screens on the screen of the monitor 2. The battery backed-up RAM 43 of the present embodiment maintains image data of titles for two screens drawn in the previous operation. These held image data are transferred to the VRAM in the VDP 44 by manipulating the selecting button 13A or 13B indicating the number of drawn images, and a previously drawn title is displayed on the screen of the monitor 2. The operator can therefore draw a desired title by modifying the displayed title.

When the mode change-over button 14 is manipulated after completing the drawing, the mode is changed over to the stand-by mode (step 104), wherein the drawn title disappears from the screen of the monitor 2. Then, a wipe-in image is selected by the drawn image selecting buttons 13A, 13B, and a wipe-in pattern is selected by the wipe-pattern selecting buttons 15A - 15D. Next, a video signal from a VTR or the like, not shown, is made effective to display an image reproduced from the video signal on the screen of the monitor 2. By pressing the executing button 9 at the time a desired scene is being displayed, the previously selected title is wiped in (step 105). A depression of the executing button 10 in this condition causes the title to be wiped out. A video signal outputted from the video titler 1 at this time is supplied not only to the monitor 2 but also to another VTR or the like for recording. Any time the operator manipulates the mode change-over button 14, the mode of the video titler 1 is changed over to the edit mode.

When the operator finally manipulates the end determining button 16 in either of the edit mode and the stand-by mode, the CPU 38 of the video titler 1 transfers image data representing titles for two screens held in the VRAM of the VDP 44 to the battery backed-up RAM 43 (step 106). Therefore, the drawn titles for two screens are not erased but maintained even if the operator afterward turns off the power supply of the video titler 1.

Further, since drawing, wipe-in and wipe-out of title images are carried out by mainly inputting coordinates to the pressure-sensitive tablet 7 with the attached pen 8 or the like, that is, by a pen operation and a manipulation of the key manipulating section 5f, the present embodiment is advantageous in largely improving the working efficiency, compared with a method of inputting coordinates by using a tracking ball or the like as before, and removing the necessity of skill for drawing title images.

Next, explanation will be given of the general operation for drawing a curve in which colors are changed in a streaming manner by pressing the vortex button 68 in the edit mode of the video titler 1 with reference to FIG. 7. The first manipulation of the vortex button 68 causes the operation of the video titler 1 to set in the vortex mode. First, the CPU 38 performs an initialization of vortex colors.

Then, a further manipulation of the vortex button 68 causes the CPU 38 to modify the vortex colors (steps 108, 109), followed by modifying the color palette at step 112 and returning to step 108. When the vortex button 68 is not being manipulated at step 108, the CPU 38 examines the presence or absence of a coordinate input on the tablet 7 (step 110). If a coordinate input is present, the color palette is modified after a vortex line is drawn at step 111. If there is no coordinate input, the color palette is modified directly at step 112.

The operation at steps 108 to 112 is executed approximately at a speed of once for every 1/60 second.

Figure 8:
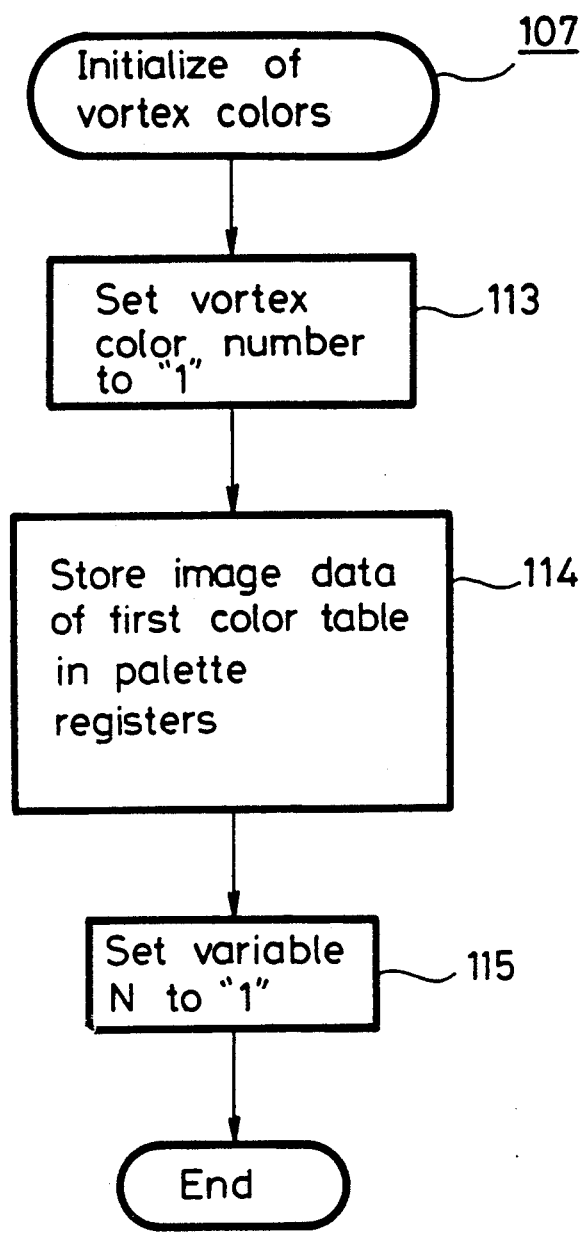

In the above-mentioned initialization of vortex colors at step 107, "1" is set as a vortex color number as shown in FIG. 8 (step 113). The RAM 43 of the video titler 1 is provided with 10 color tables transferred from the ROM 42 upon turning on the power supply. A first color table 74, for example, stores a MAX sets of R, G and B image data with a color number from 1 to MAX, as shown in FIG. 9A. Specifically, image data representing light red, red and deep red are stored in sets, the color numbers of which are 1, 2, 3, respectively. Similarly, a second color table 75 is divided into MAX sets, as shown in FIG. 9B. In sets, the color numbers of which are 1, 2, 3, respectively, there are stored image data representing light blue, blue and deep blue. The structure of other color tables with different color numbers are similar, however, the maximum value MAX of the color number is different according to the respective color tables.

At step 114, the CPU 38 writes MAX sets of the R, G, B image data in the first color table in the RAM 43 into the palette registers 47R–47B shown in FIG. 5 and then sets the initial value of a variable N used in the following procedure to "1" (step 115).

Figure 7:
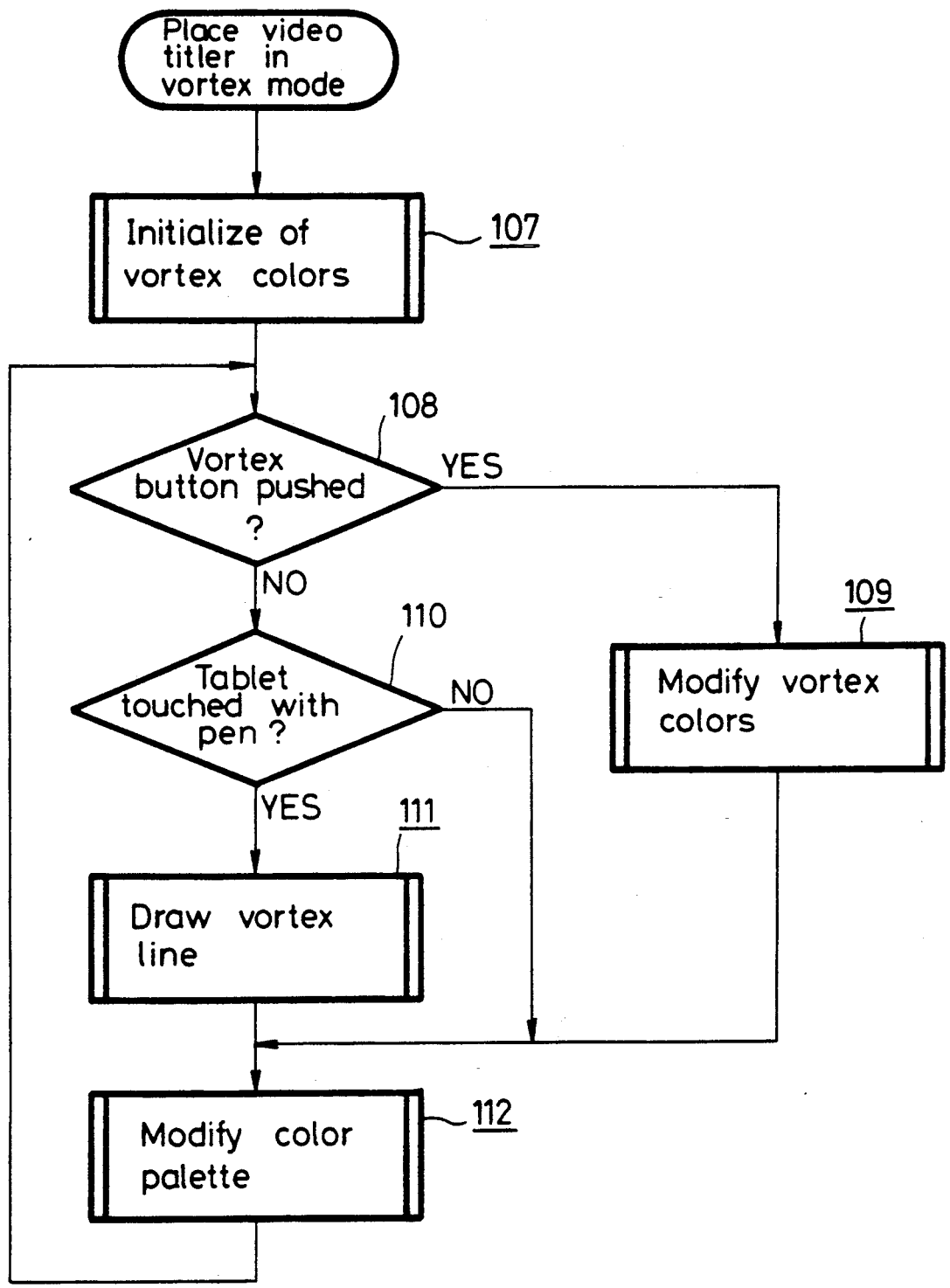
FIGS. 7 and 8 are flowcharts, respectively, to which references will be made in explaining operation of the video titler in the vortex mode.
Figure 10:
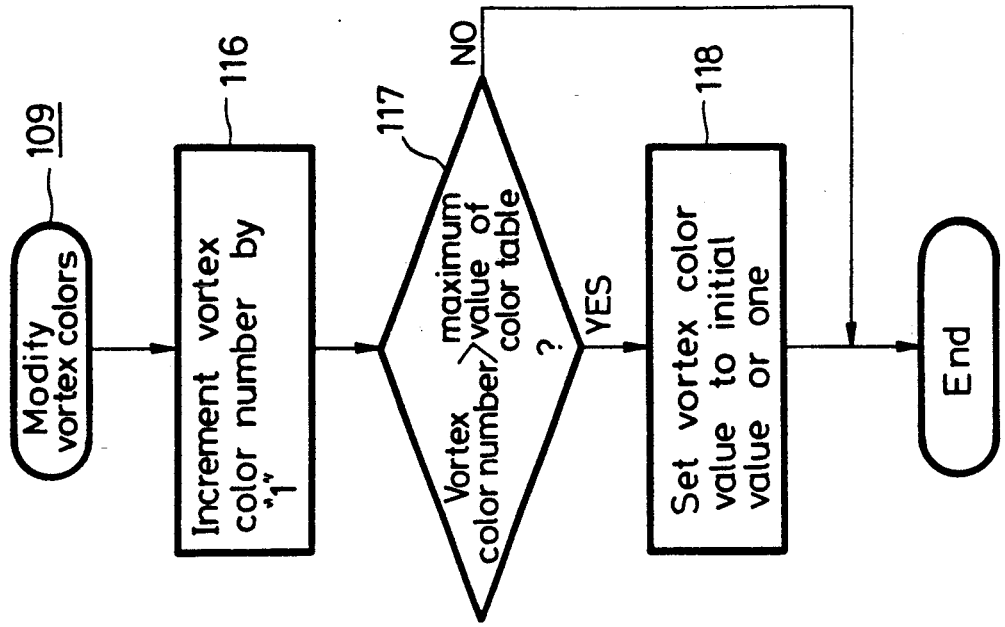
FIGS. 10-12 are flowcharts, respectively, to which references will be made in explaining operation of the video titler in the vortex mode.

In the operation for modifying the vortex colors at step 109 shown in FIG. 7, the CPU 38 increments the vortex color number by one, as shown in FIG. 10 (step 116). If the value of the vortex color number has exceeded a maximum value of the color table (10 in the present embodiment), the value of the vortex color value is set back to the initial value or one (steps 117, 118). If it is below the maximum value, the next operation will be performed.

Figure 11:
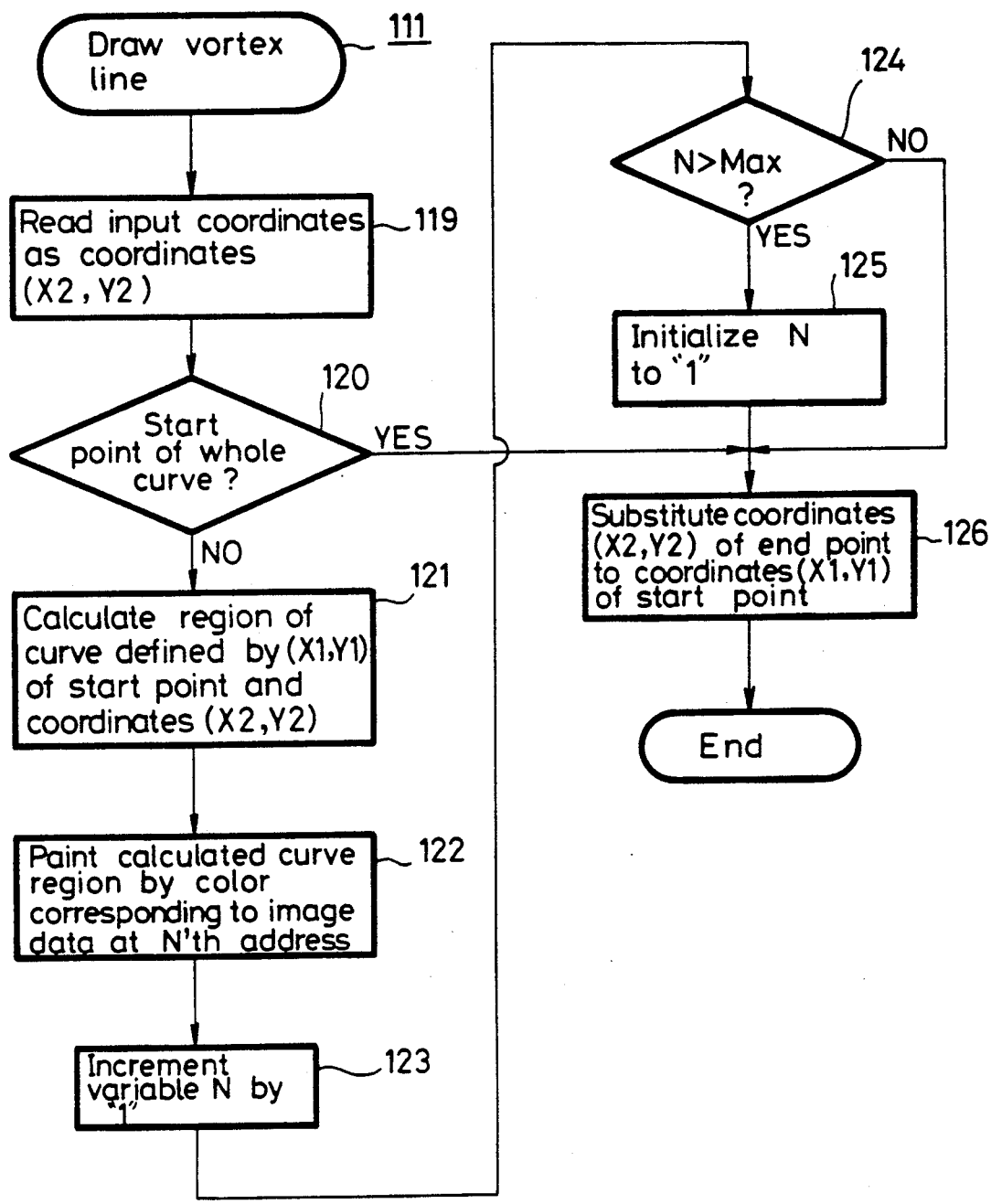

In the operation for drawing a vortex line at step 111 shown in FIG. 7, the CPU 38 reads input coordinates on the tablet 7 (step 119) and assigns the read coordinates as the coordinates (X2, Y2) at a final point, as shown in FIG. 11. If the input coordinates are the first performed one, that is, if the coordinates indicate a start point of a whole curve, the CPU 38 substitutes the coordinates (X2, Y2) of the final point for the coordinates (X1, Y1) of the start point of the curve and proceeds to the operation for modifying the color palette shown in FIG. 7 (steps 120, 126).

On the other hand, if the coordinates do not indicate a starting point of a whole line, the operation of the CPU 38 proceeds from step 120 to step 121, where a region of the curve defined by the coordinates (X1, Y1) of the starting point and the coordinates (X2, Y2) of the final point is calculated, for example, by a method such as a two-dimensional curve interpolation or the like. The width and condition of the curve are automatically set by previously pressing either of the fine line button 52—the checker button 56 shown in FIG. 2. Thereafter, the CPU 38 writes address data indicating the N'th address (an initial value of N has been set at step 115) of the palette registers 47R –47B as image data in the VDP 44 corresponding to the calculated curve region (step 122). In response thereto, the calculated curve region is painted in a color corresponding to the color image data at the N'th address on the screen of the monitor 2.

Next, the CPU 38 increments the value of the variable N by one and examines whether the value of the variable N exceeds the maximum value MAX of the color number (steps 123, 124). When the value N has exceeded the maximum value MAX, the value N is initialized to be one at step 125. When the value N, on the other hand, is below the maximum value MAX, the operation proceeds directly to step 126, where the coordinates (X2, Y2) of the end point is substituted for the coordinates (X1, Y1) of the starting point. When next coordinates are thereafter inputted on the tablet 7, they are recognized as the coordinates of an end point of the next curve. This region is painted in a color corresponding to color image data at the address next to the previous one of the pattete registers 47R to 47B.

Figure 12:
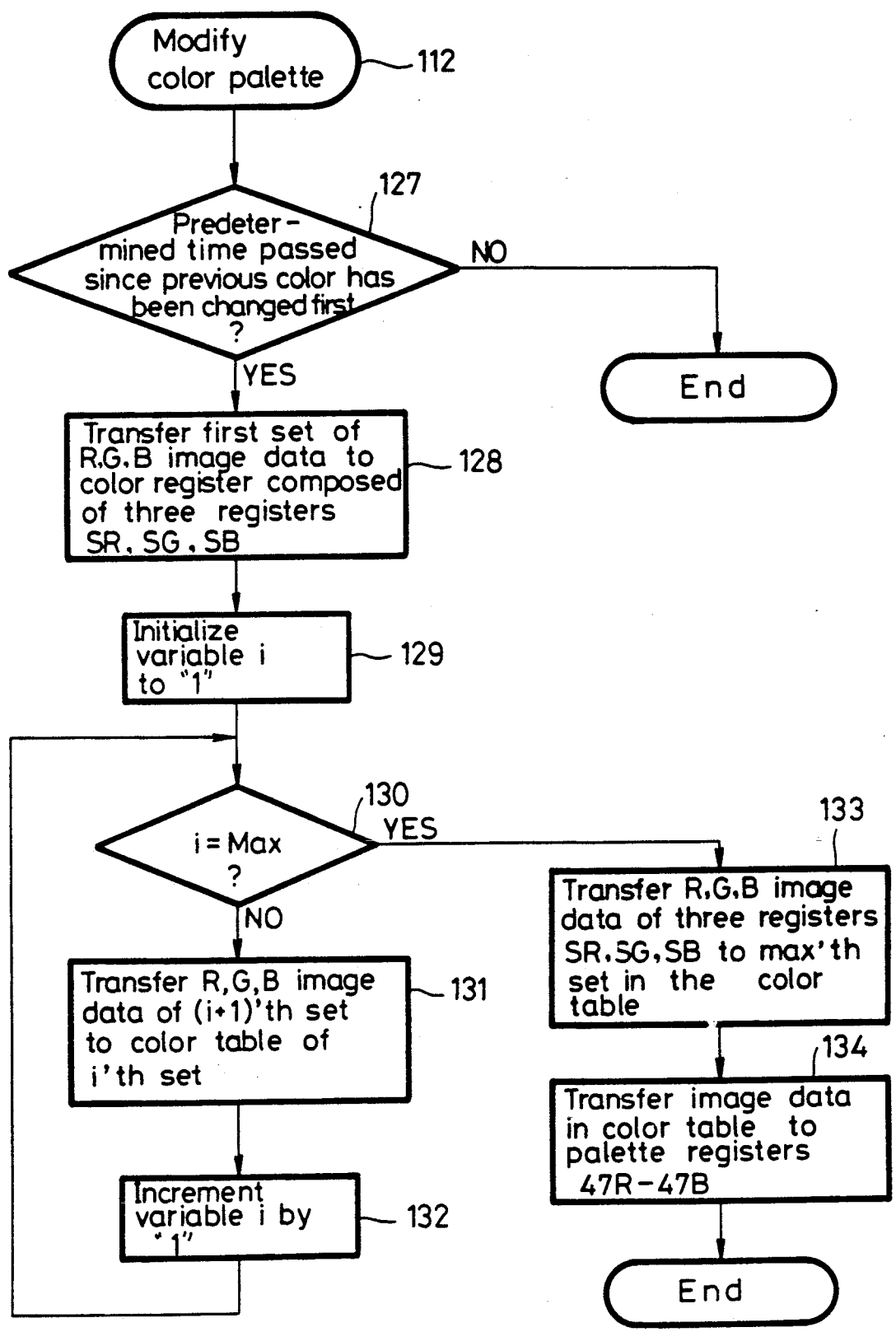

In the operation for modifying the color palette at step 112 shown in FIG. 7, the CPU 38 examines whether or not a predetermined time (for example 0.3 second) has elapsed from the time at which the previous color had been first modified, as shown in FIG. 12 (step 127). If the predetermined time has not elapsed, the operation of the CPU 38 jumps back to step 108 shown in FIG. 7 without modifying the color. If the predetermined time has elapsed, the operation proceeds to step 128, where the first set of R, G, B image data in the color number table 76 with the presently designated vortex color number shown in FIG. 13 are transferred to a color register 77 composed of three registers SR, SG, SB on the RAM 43, and the value of a variable i indicating the color number is initialized to one (step 129).

The CPU 38 then examines whether or not the value of the variable i has reached the maximum value MAX of the color number (step 130). If the maximum value MAX has not been reached, the (i+1)'th set of R, G, B image data in the col⌒r table 76 is transferred to the i'th set, and the value of tne variable i is incremented by one (steps 131, 132), followed by the operation returning again to step 130. On the other hand, if the value of the variable i has reached the maximum value MAX, the CPU 38 transfers R, G, B image data in the color register 77 to the MAX'th set in the color table 76 (step 133) and then transfers image data in the color table 76 to the palette registers 47R–47B (step 134), followed by the operation returning to step 108 shown in FIG. 7.

In other words, by the color palette modifying operation shown in FIG. 12, the MAX sets of image data in the color palette registers 47R–47B shown in FIG. 7 are recursively moved by one set in set units, so that colors of the curve displayed on the screen of the monitor 2, in response to that, recursively change in a streaming manner. More specifically, assume, for example, that the maximum value MAX of the color number of the presently designated color table 76 is four, and a line 78 shown in FIG. 14A is displayed as a curve changing in a stream fashion (a vortex line) on the screen of the monitor 2. At a certain time, a predetermined length 78A from the starting point of the line 78 is composed of four single color portions 79A–79D respectively painted in four different colors. A region between the portion 78A and the end point at which the cursor 72 is located is divided into portions 78B, 78C in which colors are changed in the same order as the portion 78A.

In the present embodiment, since input coordinates on the tablet 7 are taken in every 1/60 second, the length (the length indicated by ΔL in FIG. 14D) of the single color portion 79A and so on corresponds to a length over which the operator slides the attached pen 8 or the like on the tablet 7 during 1/60 second. Incidentally, the length of the single color portion 79A and so on can be extremely easily made corresponding to a length over which the operator slides the attached pen 8 or the like on the tablet 7 during an integer multiple of 1/60 second by modifying the operation shown in FIG. 11. The value of the integer multiple may be changed in accordance with a speed at which the operator slides the attached pen 8 or the like. For example, it may be changed to be small if the sliding speed is fast, and large if the sliding speed is slow.

According to the present embodiment, the colors in the respective portions 78A–78C included in the line 78 are recursively changed respectively by a single color portion after approximately 0.3 second, whereby the color pattern of the line 78 is changed as shown in FIG. 14B. Then, the colors of the line 78 are periodically changed such as FIG. 14C→FIG. 14D→FIG. 14A→ FIG. 14B→... every time approximately 0.3 second has elapsed, wherein the colors of the line 78 are changed as if the four kinds of colors were streaming. It is therefore possible, according to the present embodiment, to change colors of arbitrary curves (characters, figures or the like), which have been drawn or are being presently drawn, so as to appear that plural kinds of colors are streaming only by manipulating the vortex button 68 by the operator after or in course of drawing, thereby providing a benefit that moving title image having high visual effects can be drawn.

Incidentally, it is also possible to draw such a moving image, for example, by using as the VDP 44 shown in FIG. 5 a processor capable of processing moving images. However, such a processor for processing moving images, which is expensive and large as well as requires complicated parameter setting for generating moving images, is not appropriate to be readily used as the video titler 1. In contrast, the system as the present embodiment which recursively rewrites image data in the palette registers 47R –47B at predetermined intervals can employ a cheap and small-sized processor for processing still images as the VDO 44 and does not require complicated parameter setting, thereby producing a benefit of providing an extremely small, cheap and handy video titler.

Figure 15A:
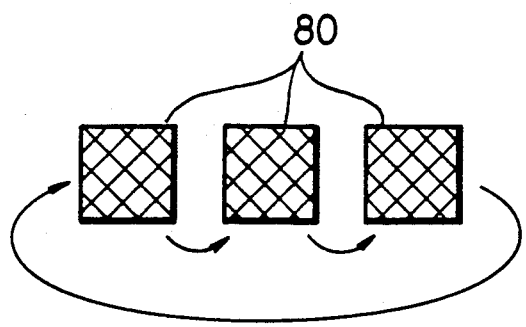
FIGS. 15A, 15B, 16 and 17 are diagrams, respectively, showing other examples of changes in colors in the vortex mode.
Figure 15B:
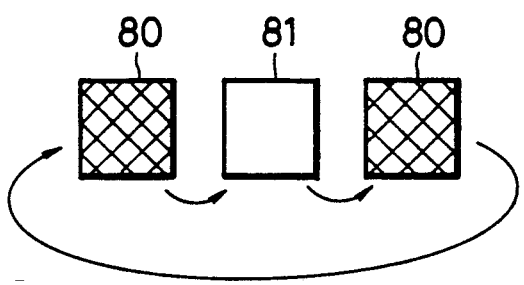

In the above-mentioned embodiment, all different colors are recursively rotated. However, normally as shown in FIG. 15A, a color except for white identical to three single color portions serially included in a drawn line may be added to the series of the color portions and rotated at the predetermined intervals. Alternatively, as shown in FIG. 15B, white 81 may be added to one of three single color portions approximately at a rate of, for example, once for every several ten rotations, and the white only may be rotated once. Such operations produce effects of metallic brilliance or metallic brightness.

Figure 16:
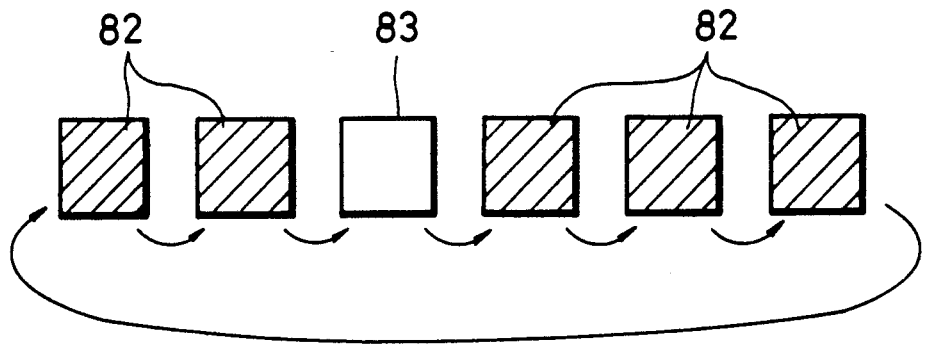

Further, it is also possible, as shown in FIG. 16, to paint the series of the single color portions except for a place in a background color 82 and the place in white 83 and rotate the white at predetermined intervals. It should be noted that black or the like may be employed in place of the background color 82. In this case, an effect of shooting a star on the screen is produced.

Figure 17:
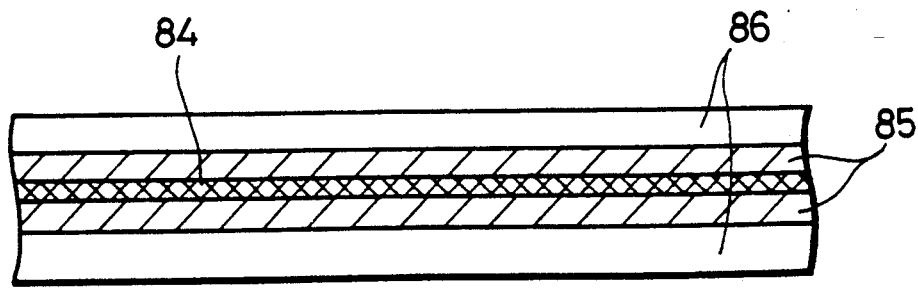

The above mentioned embodiment is applied to divide a curve in its longitudinal direction and paint the divided portions in an identical color or different colors. Alternatively, a curve may be divided in its width direction as shown in FIG. 17 into a central portion 84, intermediate portions 85 and edge portions 86, where the respective portions 84 to 86 may be painted respectively in different colors, and these colors may be recursively rotated at predetermined intervals. In this case, it is possible to produce effects of showing as if the colors sprang out of the central portion 84 of the curve.

Next, explanation will be given of the operation for displaying an image corresponding to a character pattern previously stored in the ROM 42 on the screen of the monitor 2 by using the video titler 1 of the present embodiment. In this operation, the operator presses the character button 66 (refer to FIG. 2) to thereby display a character selecting menu shown in FIG. 18 on the screen of the monitor 2 and a cursor 87 in the form of a hand at a certain position of the screen. There are provided 70 kinds of character patterns in 16×16 dots. The cursor 87 moves in association with the movement of the attached pen 8 or the like which is slid on the tablet 7 by the operator. Then, a depression of the executing button 9 at the time the cursor 87 is positioned on a desired character pattern causes the form of the cursor 87 to be changed to the selected character pattern and the character selecting menu to disappear to set the titler in a drawing condition. By sliding the attached pen 8 or the like in this condition to move the character pattern to a desired position and pressing the executing button 9, the character pattern is placed at the desired position. Similarly, a series of character patterns can be displayed on the screen.

Figure 19:
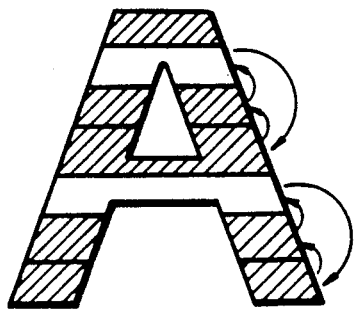
FIGS. 19 and 20 are diagrams, respectively, showing an example of changes of colors in characters carried out in the vortex mode.
Figure 20:
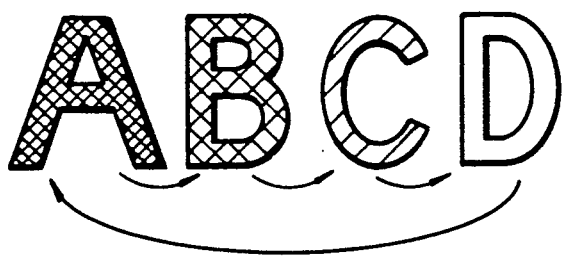

In the present embodiment, it is also possible to set colors of such character patterns to vortex colors. More specifically, the operator again presses the character button 66 to display the character selecting menu shown in FIG. 18 on the screen of the monitor 2. The selecting menu includes patterns 88A-88E indicating four kinds of vortex colors displayed in a right end portion thereof. These patterns correspond to the following vortex colors, respectively:

Pattern 88A ... colors are changed as if they spring out of the center of a character;

Pattern 88B ... colors are changed in a rotating manner from the lower part to the upper part in the horizontal direction of a character as shown in FIG. 19;

Pattern 88C ... colors are changed in a rotating manner from left to right in the vertical direction of a character;

Pattern 88D ... colors are changed as if they sprang out of the boundary of a character toward the outside; and Pattern 88E ... a plurality of characters, aligned, for example as shown in FIG. 20, are respectively painted in different colors from one another, and these colors are recursively rotated.

Figure 18:
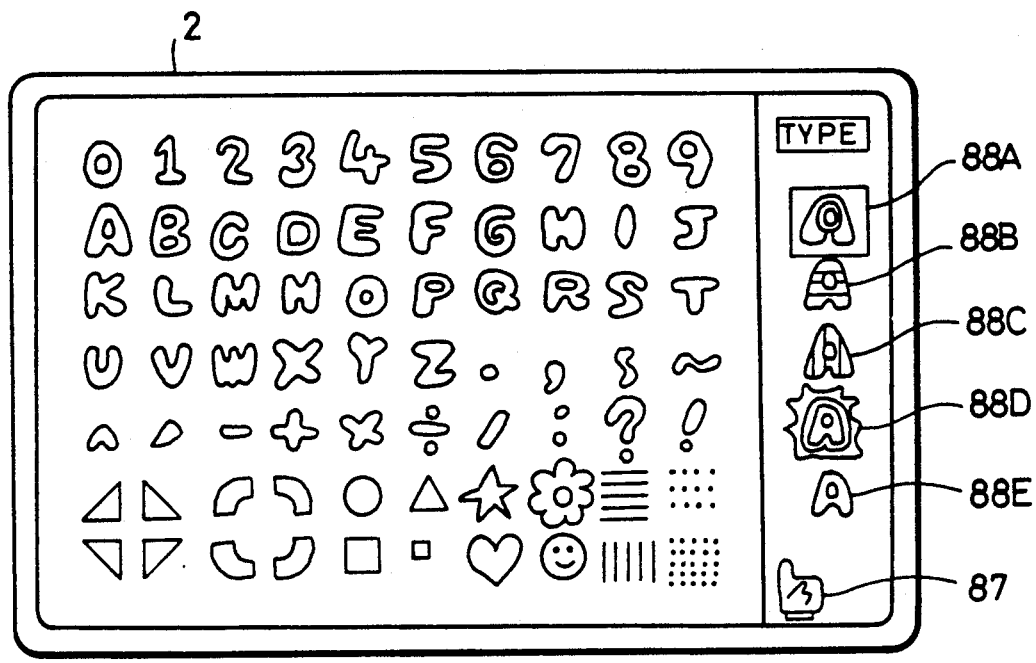
FIG. 18 is a front view illustrating the character selecting menu generated by the video titler of the embodiment.

For setting a character pattern of the present embodiment to either of the above-mentioned vortex colors, the cursor 87 is moved onto a desired pattern within these patterns 88A-88D on the character selecting menu shown in FIG. 18, and then the executing button 9 is pressed. In response thereto, a selected vortex color pattern is set to characters.

According to the present invention, there is provided a benefit of drawing moving characters, figures and so no exhibiting high visual effects in a simple structure without making a complicated designation.

Having described a preferred embodiment of the invention with reference to the accompanying drawings, it is to be understood that the invention is not limited to that precise embodiment and that various changes and modifications thereof could be effected by one skilled in the art without departing from the spirit or scope of the novel concepts of the invention as defined in the appended claims.

We claim as our invention:

1. An image drawing apparatus for sue with a video titler, comprising:
   memory means for storing a plurality of predetermined color data;
   processing means for outputting colors corresponding to said color data upon command at predetermined display positions on a display screen of a display which is operatively connectable with said video titler, said processing means including means for mixing said color data with video signals to produce a composite video signal for display at said display screen;
   coordinate data input means including a pressure sensitive tablet and a pen for drawing images on a pressure sensitive surface of the tablet, for inputting coordinate data which designate coordinates at which color is to be displayed on said display screen; and
   control means responsive to a manually generated vortex mode signal for sequentially moving an array of said plurality of predetermined color data from said memory means, for inducing the plurality of color data to be recursively moved and superimposed upon a shape designated by the coordinate data inputted by said coordinates data input means, and for causing the shape to have a number of colored stripes which recursively change color in a streaming manner.

2. An image drawing apparatus according to claim 1 further comprising key manipulating means.

3. An image drawing apparatus as claimed in claim 1, wherein said coordinate data input means includes a color selecting area, a command selecting area and an image drawing area.

4. An image drawing apparatus as set forth in claim 1, wherein said coordinate data input means include a pressure-sensitive type position detecting apparatus.

5. An image drawing apparatus as set forth in claim 1, wherein said control means includes a video processor with a multi-frame capacity for receiving input coordinate data and color data from said memory means.

6. An image drawing apparatus comprising:
   a pressure sensitive tablet having a coordinate input surface which is pressure sensitive to a stylus for drawing images and producing coordinate input data;

first memory means for storing a variety of color data;

control means cooperating with said first memory means for coordinating said coordinate input data with said color data;

video processing means having a video memory for reading said first memory means as commanded by said control means for writing color image data into corresponding addresses o the video memory;

video encoder means for converting the supplied image data from said video memory to a video signal for display at a display means which is connectable with said image drawing apparatus and manually operable vortex circuit means or selectively inducing said video processing means to operate in a vortex mode and recursively move said color image dta written into the addresses of said video memory means in set units so that an image, as determined by said coordinate input data which is displayed on the display means, recursively changes color in a streaming manner.

7. A video titler comprising:

video processor means, operatively connected through a peripheral interface with manually operable data input means including a pressure sensitive tablet having a coordinate input surface which is pressure sensitive to a stylus for drawing images, for processing still images;

first, second, and third address selectors operatively connected with said video processor means by way of bus means for respectively receiving red, green and blue related signals from the video processor means first, second, and third palette registers operatively connected with said first, second, and third address selectors by said bus means for holding a plurality of data relating to red, green and blue signal components, respectively, said first, second, and third palette registers being so constructed and arranged that the plurality of data can be recursively written thereinto;

manually operable vortex circuit means for selectively inducing the plurality of data in said first, second and third palette registers, to recursively move in one set in set units so that an image drawn on said pressure sensitive surface by said stylus, is striped with different color stripes which recursively changes color in a streaming manner when displayed;

encoder means operatively connected by said bus means with said first, second and third palette registers by way of first second and third bidirectional data selectors; and mixing circuit means having a first input adapted for connection with a source of video signals and with a display, said mixing circuit means receiving a signal from said encoder means.

8. A video titler as set forth in claim 7, wherein said mixing circuit means comprises first and second mixing circuits, said first mixing circuit having a first input adapted for connection to a source of composite video signals and a first output adapted for connection with a display, said mixing circuit receiving a composite video signal (V) from said encoder means, said second mixing circuit having a second input adapted for connection with a source of separated video signal (Y/C) and a second output for connection with a display, said second mixing circuit receiving a separated video signal (Y/C) from said encoder means.

9. A video titler as set forth in claim 8, further comprising switch means for selectively rendering one of said first and second input terminals effective.

10. A video titler as set forth in claim 7, further comprising a timing circuit which is operatively connected with said first, second and third address selectors and the first, second and third data selectors and which is responsive to said video processor.

11. A video titler ass et forth in claim 10, further comprising:

a CPU operatively connected with said bus means and said timing circuit, said bus means further being operatively connected with said first, second, and third address selectors, the first, second, and third bidirectional data selectors and the peripheral interface; and memory means operatively connected with bus means for storing programs and a variety of color data including color tables.

* * * * *